United States Patent [19]

Smith, Jr.

[11] 4,122,341
[45] Oct. 24, 1978

[54] CEMENTING METHOD TO IMPROVE WELL LOGGING MEASUREMENTS IN CASED WELL BOREHOLES

[75] Inventor: Harry D. Smith, Jr., Houston, Tex.

[73] Assignee: Texaco Inc., New York, N.Y.

[21] Appl. No.: 801,677

[22] Filed: May 31, 1977

Related U.S. Application Data

[63] Continuation of Ser. No. 689,442, May 24, 1976, abandoned.

[51] Int. Cl.² .............................................. G01V 5/00
[52] U.S. Cl. .................................... 250/267; 250/259
[58] Field of Search ............... 250/267, 266, 269, 270, 250/259

[56] References Cited

U.S. PATENT DOCUMENTS

| 2,862,106 | 11/1958 | Scherbatskoy | 250/267 |
| 2,910,591 | 10/1959 | Baker | 250/267 |
| 3,065,346 | 11/1962 | Dewan et al. | 250/267 |
| 3,462,600 | 8/1969 | Dewan | 250/269 |

Primary Examiner—Harold A. Dixon
Attorney, Agent, or Firm—Carl G. Ries; Thomas H. Whaley; William J. Beard

[57] ABSTRACT

According to the method of the present invention a well cement having a high thermal neutron capture cross section is used when cementing the well casing in place. This, possibly together with the use of other high thermal neutron capture cross section materials in the borehole, such a highly saline borehole fluid and/or high thermal neutron capture cross section material sleeves on the well logging sonde, increases the effective depth of investigation of thermal neutron lifetime well logging instrumentation.

3 Claims, 3 Drawing Figures

CEMENTING METHOD TO IMPROVE WELL LOGGING MEASUREMENTS IN CASED WELL BOREHOLES

This application is a continuation of copending application Ser. No. 689,442 filed May 24, 1976 and now abandoned.

BACKGROUND OF THE INVENTION

This invention relates to improved techniques for conducting well logging operations and more particularly to a method for improving the results of thermal neutron decay time or neutron lifetime well logging by the employment of well cement having a high thermal neutron capture cross section.

In recent times the logging of cased well boreholes has become an important function in the petroleum producing industry. These logging operations have become important due to the increased amount of well work over activity in old wells, and in new wells because of the precision with which measurements may be made which relate to the earth formation water and oil saturations through the use of nuclear logging instruments. In particular, the thermal neutron lifetime or thermal neutron decay time log has become important in the logging of cased well boreholes due to the fact that this instrument can measure the thermal neutron macroscopic capture cross-section of the earth formations. This macroscopic capture cross-section (if the earth formation porosity is known) may be used to determine directly the water saturation, Sw, and hence to infer the oil saturation, of formations adjacent to a cased well borehole.

Nuclear well logging parameters such as the thermal neutron decay time are particularly important because in a cased well borehole it is difficult to obtain other more conventional types of well logs such as resistivity logs, which are shorted out by the steel casing which separates the borehole from the earth formations surrounding it. Thus in some instances the thermal neutron decay time or neutron lifetime logs may serve to be the most effective instrument for investigating earth formations in the vicinity of a caed well borehole.

Commercially available techniques for performing thermal neutron lifetime or thermal neutron decay time measurements in the vicinity of a cased wellbore have generally assumed that the thermal neutron lifetime or thermal neutron decay time of the borehole fluid immediately surrounding the detector used in such a system is substantially shorter than that of the earth formations in the vicinity of the borehole. Under such conditions the measurements made in typical cased well boreholes can accurately reflect the macroscopic thermal neutron capture cross-section of the earth formation surrounding the borehole. In laboratory studies of the depth of investigation of such systems however, it has been found that the thickness of the cement sheath surrounding the well casing can effect the measurement. In particular, it has been found that if this cement sheath has a relatively low macroscopic thermal neutron capture cross-section, the effective region of investigation of such an instrument is drastically reduced to that interval very near the borehole. It has also been found that variations in the thickness of the cement sheath under these conditions can deteriorate the quality of the measurement of thermal neutron lifetime or thermal neutron decay time of the earth formation materials in the vicinity of the borehole to the point where the formation materials may only contribute small amounts to the total measurement.

BRIEF DESCRIPTION OF THE INVENTION

Accordingly, the present invention comprises techniques for modifying the thermal neutron lifetime of the cement sheath surrounding the cased wellbore. It has been found that if the cement material is doped with a material having a relatively high macroscopic thermal neutron capture cross-section, the average depth of investigation of thermal neutron lifetime or thermal neutron decay time measuring instrumentation in the wellbore is appreciably enhanced. Also, it has been found by performing the doping of the cement column in this manner that variations in cement sheath thickness contribute less to the error in determining the earth formation thermal neutron lifetime or thermal neutron decay time than might otherwise be expected.

BRIEF DESCRIPTION OF THE DRAWINGS

The present invention is best understood by reference to the following detailed description when taken in conjunction with the accompanying drawings in which.

DESCRIPTION OF THE PREFERRED EMBODIMENT

Figure 3:
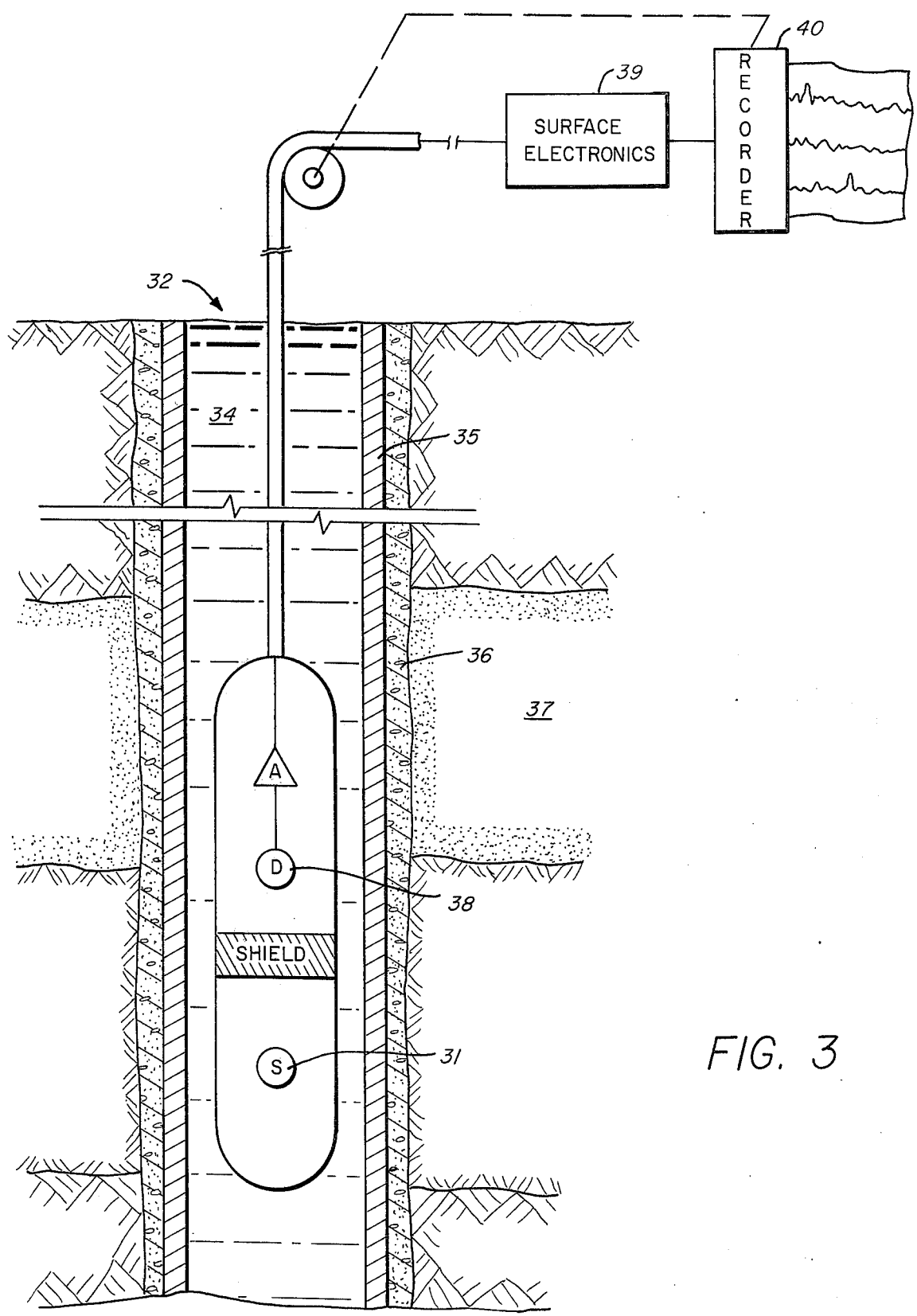
FIG. 3 illustrates well logging according to the invention.

Referring initially to FIG. 3, in presently available commercial well logging systems for determining the thermal neutron lifetime or decay time, a pulsed neutron source 31 is utilized. This source 31 is used to inject pulses of fast neutrons repetitively into the earth formations in the vicinity of the borehole 32. For each fast neutron pulse a cloud of fast neutrons is injected in a generally spherically symetric fashion about the source into the surrounding earth formations. This fast neutron cloud or population passes from the well tool 33 through the borehole fluid 34, the casing 35, and the cement layer 36 between the casing and the earth formation 37 surrounding the wellbore. Each such pulse of fast neutrons has approximately a constant intensity and last typically for a time duration of from 20 to 30 microseconds or more. These neutrons are rapidly thermalized, principally via elastic collisions with hydrogen in the borehole and formation. The number of thermal neutrons comprising this cloud or population then decays exponentially due to the capture of the thermalized neutrons by the elemental nuclei comprising the earth formation and and borehole constituents. Immediately following each neutron capture, characteristic capture gamma radiation is emitted by the capturing nucleus. This is detected by a detector 38 and transmitted to the surface electronics 39 which process the data and records it on recorder 40.

After an initial time period (usually about 300 microseconds) during which it is assumed that resultant capture gamma ray effects in the borehole fluid and casing are substantially dissipated, measurements are made of the number of thermalized neutrons in the vicinity of the wellbore during two (or more) successive discrete time intervals. These measurements can be used to determine the exponential decay curve for the thermal neutron population either in the borehole or the earth formations surrounding the borehole. It is usually assumed that the borehole component of the thermal neutron decay time or thermal neutron lifetime is shorter than that of the formation thermal neutron decay time or thermal neutron lifetime and hence the borehole signal dissipates before. This usually occurs where the fluid filling the borehole has a high chlorine or salt water content, since the chlorine nucleus has particularly large capture cross-section for thermalized neutrons. However, in boreholes containing air, gas, fresh water or oil this relationship or assumption does not always prove to be accurate. It has been known in the prior art to surround the well tool in the borehole with highly saline water in order to assure that this short borehole component of thermal neutron lifetime be present. Alternatively, other prior art proposals have been to surround the body of the well tool with a sleeve impregnated with boron or some other thermal neutron absorber having a high capture cross-section in order to render the assumption that the borehole component is substantially shorter than that of the formation valid.

The two discrete measurement periods of the thermalized neutrons in the vicinity of the well tool can be fixed at approximately 400 to 600 microseconds following the neutron burst and 700 to 900 microseconds following the neutron burst in typically encountered earth formations. The first detection time interval is delayed several hundred microseconds following the neutron burst in order to eliminate the borehole component. This is especially effective if a high chlorine content fluid is present in the borehole. Other thermal decay time measurements obtained using variable gate widths and positions are similarly affected by the borehole fluid salinity.

The thermal neutron decay time logging instruments are usually used in this manner in order to obtain $\Sigma$ values from which water saturation ($S_w$) characteristic of the earth formation surround the borehole can be calcuated. It is usually assumed that these measurements are not influenced by the presence of cement thickness variations caused by nonuniform washout of the annulus between the casing and the formations. However, experimental investigation of the performance of thermal neutron lifetime well logging instruments has shown that the observed macroscopic capture cross-section ($\Sigma$) depends on the cement thickness. It has been experimentally observed that, if the cement sheath surrounding the casing has a constant thickness throughout a logged interval, the log interpretation is affected only to the extent that the formation signal in all zones is reduced by a relatively fixed amount. This would present a correctable problem. However, if variations in the cement thickness are observed then significant changes in the measured water saturation $S_w$ can occur. This is true particularly if the capture cross-section $\Sigma$ of the cement is significantly less than that of the earth formations or the borehole fluid.

In the experimental studies conducted on the depth of the investigation of thermal neutron lifetime logs, it has been observed that the sensitivity of the measured formation $\Sigma$ to a given radial annulus of material such as cement adjacent to the borehole wall is inversely related to the $\Sigma$ of this annular region. This may be seen more clearly by reference of Table 1.

Table 1

| Percentage of Signal Originating Within Annulus | Annular Radius of Foreign Material (Cement or Mud) | |
|---|---|---|
| | Annulus $\Sigma = 33$ c.u. | Annulus $\Sigma = 17$ cu. |
| 10% | 3.1 inches | 1.2 inches |
| 50% | 6.8 inches | 3.9 inches |
| 90% | 11.5 inches | 8.2 inches |

Stated in another manner, if a given thickness of cement or other near borehole constituent has a high $\Sigma$ value, then a larger percentage of the detected thermal neutron capture gamma rays come from outside this cement region. The implication of this is that variations in the thickness of high capture cross-section cement will have a smaller effect on the calculated formation water saturations than thickness variations in lower capture cross-section cements. From Table 1 data it can be seen that only 1.2 inch of low $\Sigma$ cement is required to cause a 10% distortion in the measured formation $\Sigma$, while 3.1 inch of high $\Sigma$ cement is required to produce the same distortion.

In an example illustrated in Table 2 it is postulated that the capture cross-section ($\Sigma$) for a water sand is equal to 38 capture units and that the capture cross-section for an oil sand is equal to 13 capture units. Referring now to Table 2, the results for 1 inch and 4 inch cement annuli about a casing using two different cements (one having a relatively high capture cross-section of 33 capture units and the other having a relatively low capture cross-section of 17 capture units) are shown. The errors caused by the cement in the water saturation S as derived from the measured thermal neutron decay times are illustrated.

As a specific illustration from the table, consider the case where the cement surrounding the casing is 4 inches thick and has $\Sigma = 17$. Opposite a $\Sigma = 38$ cu water sand, the cement would distort the observed value from the expected value of 38 cu. to a measured value of 27 cu. Using this measure $\Sigma$ to calculate $S_w$ in the zone, one would arrive at $S_w = 56\%$, instead of the actual 100% (hence the $-44\%$ $S_w$ indicated in the Table for these conditions).

TABLE II

| Cement Type | Formation | Change in Derived Water Saturation $S_w$ | |
|---|---|---|---|
| | | 1 in. cement | 4 in. cement |
| $\Sigma = 17$ cu. | oil sand (= 13 cu.) | +1 (% $S_w$) | +8 (% $S_w$) |
| | water sand (= 38 cu.) | −8 (% $S_w$) | −44 (% $S_w$) |
| $\Sigma = 33$ cu. | oil sand (= 13 cu. | +1 (% $S_w$) | −14 (% $S_w$) |
| | water sand (= 38 cu. | 0 (% $S_w$) | −4 (% $S_w$) |

It can be seen from Table 2 that in order to minimize the effect of changing borehole diameter and cement thickness in the vicinity of the well logging sonde that it would be highly advantageous to use cement having a high thermal neutron capture cross-section. This markedly reduce the dependence of the measured earth formation $\Sigma$ on cement thickness caused by borehole washout conditions in the vicinity of the well casing. Hence a reduction in errors is calculated $S_w$ values will result.

Figure 1:
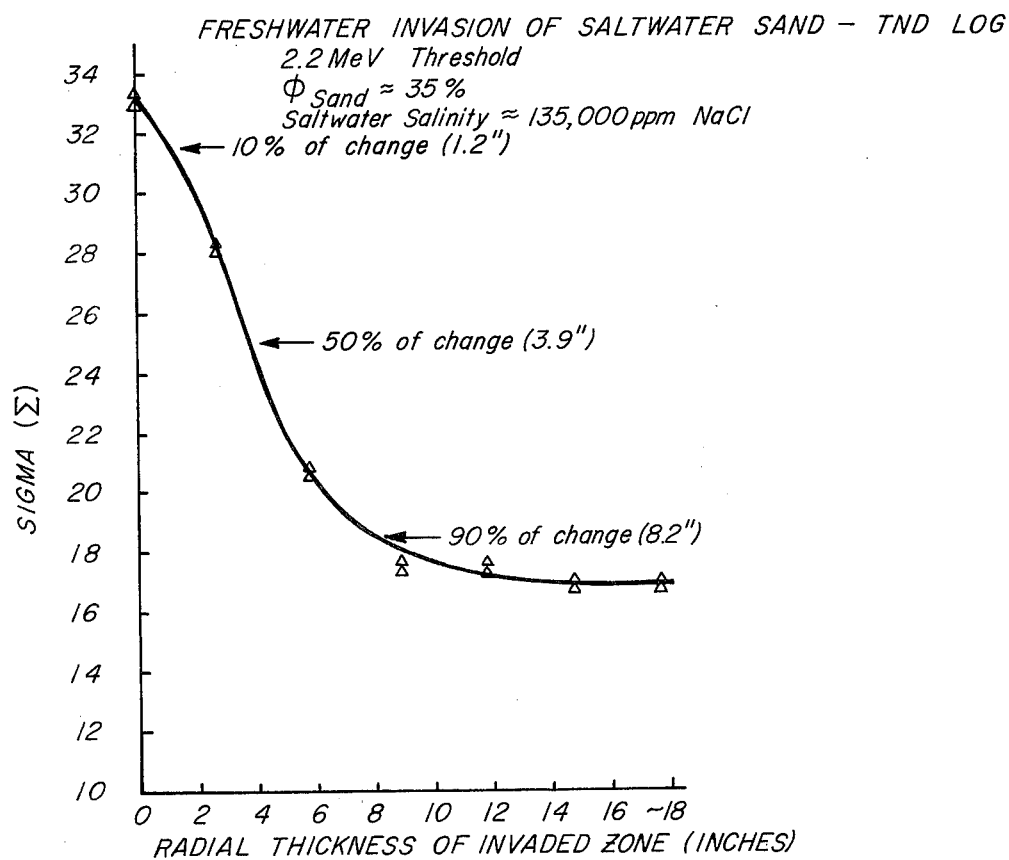
FIG. 1 is a graphical representation showing the contribution toward the measurement of thermal neutron capture cross-section as a function of distance for the fresh water invasion of a salt water sand.
Figure 2:
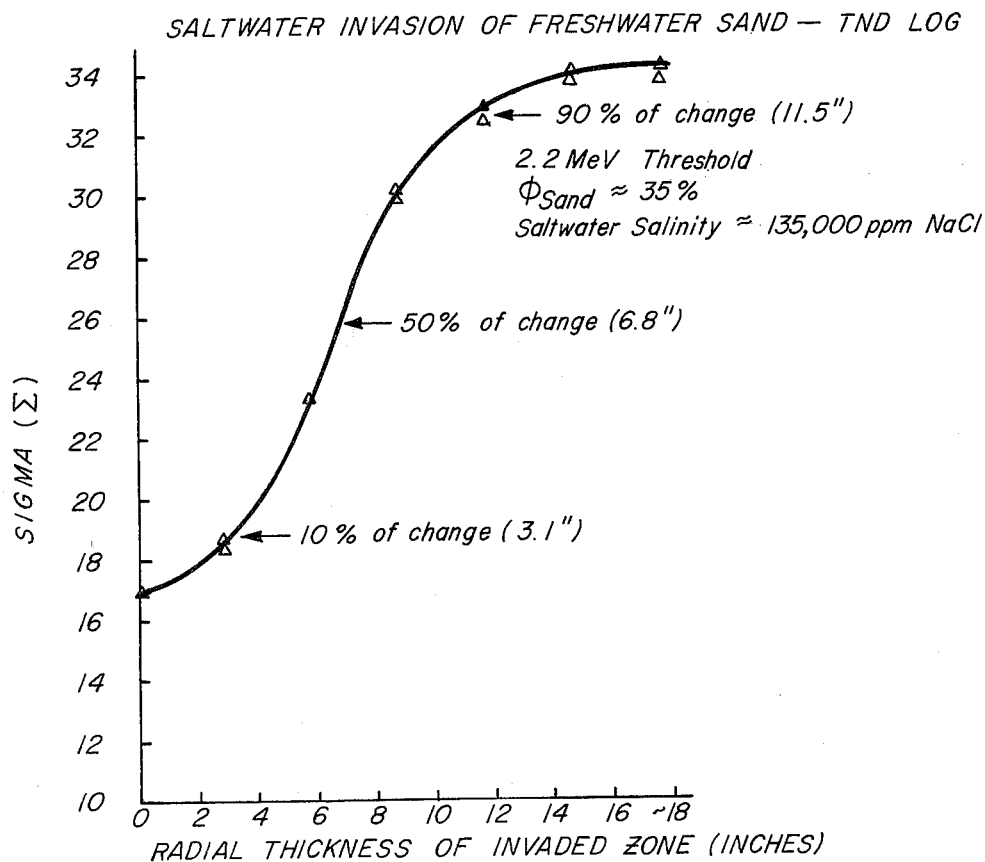
FIG. 2 is a graphical representation illustrating the contribution as a function of depth of investigation to the thermal neutron capture cross-section of a salt water invasion of a fresh water sand.

Referring now to FIGS. 1 and 2, the same effect may be observed by noting the graphical relationships of FIGS. 1 and 2 when compared to each other. FIG. 1 illustrates the case where relatively low Σ material (fresh water) is expanded in progressive radial steps outward from a neutron source and Σ detector into a 35% porosity salt water saturated sand (salinity of 135,000 ppm NaCl). It is seen from this figure, that if the low Σ material surrounds the sonde to a radial distance of approximately 3.9 inches, then 50% of the total change in the measured thermal neutron capture cross-section of the salt water sand surrounding the sonde has occurred.

Referring now to FIG. 2, the inverse situation is shown. A fresh water sand is shown surrounding a borehole and having a thermal neutron capture cross-section of about 17 capture units. Salt water having a high capture cross-section displaces the fresh water in the sand to different radial distances from the detector. The measured capture cross-section of the fresh water sand as the thickness of invading salt water sand is increased is plotted as a function of the radial thickness of the salt water zone. It is seen that approximately 6.8 inches of the high Σ fluid must be placed in the vicinity of the detector before 50% of the change in the measured Σ value is observed.

These figures re-emphasize the fact that placing a high thermal capture cross-section material in the vicinity of the borehole greatly reduces borehole induced errors in formation Σ values, relative to a low Σ near borehole material. The effects shown in Table 1 and 2 previously also provided an indication that the cement sheath capture cross-section should be maintained as high as possible in order to reduce the error in such measurements.

According to the principles of the present invention a high capture cross-section cement sheath surrounding the wellbore is accomplished by using a high thermal neutron capture cross-section material when making the cement. This may be done for example by using highly saline water in making the cement. Alternatively the water used to make the cement slurry can be doped with boron, gadolinium, cadmium, europium, samarium, or some other material having a very high thermal neutron capture cross-section. The same doping effect as obtained using 135,000 ppm sodium chloride water in mixing the cement can be accomplished by doping fresh water used to mix cement with approximately 1100 ppm of boron soluble salts.

To summarize the technique according to the present invention to improve the accuracy of thermal neutron decay time or lifetime measurements in cased wellbores, the following steps should be used in cementing the casing in place the wellbore: (1) highly saline or doped water (doped with high capture cross-section material) should be used in mixing the cement slurry, (2) in the cementing operation this high capture cross-section slurry should be pumped down the casing or a tubing string into the annulus between the casing and the walls of the well bore over the interval to be cemented, and (3) during logging operation the well logging operation the well logging instrument should be surrounded by highly saline borehole fluid and/or a high capture cross-section sleeve used about the well logging instrument in order to maintain as high a thermal neutron capture cross-section material as is possible in the immediate vicinity of the well logging instrument.

If these conditions are observed, greatly enhanced accuracy of thermal neutron decay time measurements may be expected in wellbores so prepared. Borehole washouts or variations in cement thickness in the annulus about the casing will affect the measurement much less than has heretofore been accomplished by a prior art cementing technique utilizing low Σ cement slurries.

The above description may render changes and alternatives in the technique according to the present invention apparent to those skilled in the art. It is therefore the aim in the appended claims to cover all such changes and modifications to the technique of the inventions as fall within the true spirit and scope of the invention.

I claim:

1. A method for improving the quality of neutron well logs by increasing the depth of investigation of such logs in a cased well borehole, comprising the steps of:
   cementing the casing in a cased wellbore by the distribution of a cement slurry having a large thermal neutron capture cross section in the annulus between the casing and the wall of the wellbore, said slurry being given a large thermal neutron capture cross section by virtue of mixing dry cement with a water medium having distributed therein a fractional part of a soluble chlorine compound chosen for having a large thermal capture cross section;
   filling the interior of the casing in a cased well borehole with a borehole fluid medium having a large thermal neutron capture cross section and comprising a water medium having distributed therein a fractional part of a preselected material chosen for having a large thermal neutron capture cross section; and
   moving a well logging instrument through the well borehole thereby displacing a portion of said large thermal neutron capture cross section fluid and making measurements with said instrument of earth formations in the vicinity of the borehole.

2. The method of claim 1 wherein the cementing step is performed by mixing the cement slurry with saline water having a concentration of 75,000 parts per million of sodium chloride or greater.

3. The method of claim 1 wherein the step of filling the interior of the casing is performed by filling the casing with saline water having a concentration of 75,000 parts per million of sodium chloride or greater.

* * * * *